US010725499B1

(12) United States Patent
Wan et al.

(10) Patent No.: US 10,725,499 B1
(45) Date of Patent: Jul. 28, 2020

(54) DISPLAY DEVICE

(71) Applicant: Wuhan Tianma Micro-Electronics Co., Ltd., Wuhan (CN)

(72) Inventors: Fang Wan, Wuhan (CN); Jiang Chen, Wuhan (CN)

(73) Assignee: Wuhan Tianma Micro-Electronics Co., Ltd., Wuhan (CN)

( * ) Notice: Subject to any disclaimer, the term of this patent is extended or adjusted under 35 U.S.C. 154(b) by 0 days.

(21) Appl. No.: 16/702,115

(22) Filed: Dec. 3, 2019

(30) Foreign Application Priority Data

May 31, 2019 (CN) .......................... 2019 1 0473177

(51) Int. Cl.
*G06F 1/16* (2006.01)
*A44C 5/20* (2006.01)

(52) U.S. Cl.
CPC ............ *G06F 1/163* (2013.01); *G06F 1/1652* (2013.01); *A44C 5/20* (2013.01)

(58) Field of Classification Search
CPC combination set(s) only.
See application file for complete search history.

(56) References Cited

U.S. PATENT DOCUMENTS

| 9,274,506 | B2 * | 3/2016 | Lu | G04G 17/02 |
| 9,355,534 | B2 * | 5/2016 | Soni | G08B 5/228 |
| 9,454,180 | B2 * | 9/2016 | Breedvelt-Schouten | G06F 3/017 |
| 9,570,038 | B2 * | 2/2017 | Lee | G09G 5/006 |
| 9,696,690 | B2 * | 7/2017 | Nguyen | G04G 17/083 |
| 9,727,087 | B2 * | 8/2017 | Rider | G06F 1/1652 |
| 9,734,779 | B2 * | 8/2017 | Forutanpour | G06F 3/0412 |
| 9,747,015 | B2 * | 8/2017 | Forutanpour | G06F 1/163 |
| 9,786,247 | B2 * | 10/2017 | Hong | G09G 5/003 |
| 9,848,494 | B2 * | 12/2017 | Huitema | H05K 1/183 |
| 9,857,773 | B1 * | 1/2018 | Tang | A44C 5/14 |
| 9,874,957 | B2 * | 1/2018 | Lee | G06F 3/013 |
| 9,933,756 | B2 * | 4/2018 | Tang | A44C 5/14 |
| 10,114,421 | B2 * | 10/2018 | Lo | H04M 1/0268 |
| 10,127,884 | B2 * | 11/2018 | Na | G06F 3/14 |
| 10,146,261 | B2 * | 12/2018 | Hashimoto | G06F 3/016 |
| 10,146,354 | B2 * | 12/2018 | Kim | G06F 1/1643 |
| 10,152,028 | B2 * | 12/2018 | Kim | G06F 1/1652 |
| 10,168,821 | B2 * | 1/2019 | Chi | G06F 3/14 |
| 10,185,364 | B2 * | 1/2019 | Seo | G06F 1/1652 |
| 10,191,574 | B2 * | 1/2019 | Shin | G06F 3/0416 |
| 10,289,163 | B2 * | 5/2019 | Huitema | G06F 1/163 |
| 10,338,638 | B2 * | 7/2019 | Park | G06F 1/1656 |

(Continued)

FOREIGN PATENT DOCUMENTS

| CN | 104460864 A | 3/2015 |
| CN | 207216298 U | 4/2018 |

*Primary Examiner* — Lisa Lea-Edmonds
(74) *Attorney, Agent, or Firm* — Miller, Matthias & Hull LLP

(57) ABSTRACT

Provide is a display device. The display device includes a watchcase, a first display screen and a flexible display component. The first display screen is arranged on a front side of the watchcase. The first display screen includes a first display surface. The flexible display component is arranged on a back face of the watchcase. The flexible display component may be bent along a first direction to be reused as a watchband. Moreover, in the condition that the flexible display component is reused as the watchband, a surface of the flexible display component facing away from the watchcase is a second display surface.

18 Claims, 16 Drawing Sheets

(56) References Cited

U.S. PATENT DOCUMENTS

| | | | |
|---|---|---|---|
| 10,416,713 B2* | 9/2019 | Wu | G06F 1/1635 |
| 10,459,485 B2* | 10/2019 | Inagaki | A43B 3/0005 |
| 10,466,808 B2* | 11/2019 | Yi | H04W 12/06 |
| 10,481,638 B2* | 11/2019 | Yoshizumi | H04M 1/0237 |
| 10,545,710 B2* | 1/2020 | Wu | G06F 1/1681 |
| 10,579,104 B2* | 3/2020 | Hong | A44C 5/022 |
| 2006/0209218 A1* | 9/2006 | Lee | G04G 9/00 349/1 |
| 2010/0029327 A1* | 2/2010 | Jee | G06F 1/163 455/556.1 |
| 2013/0222270 A1* | 8/2013 | Winkler | H04B 1/385 345/173 |
| 2014/0337621 A1* | 11/2014 | Nakhimov | G06F 3/03547 713/168 |
| 2015/0185781 A1* | 7/2015 | Yu | G06F 3/017 345/173 |
| 2016/0058133 A1* | 3/2016 | Fournier | A61B 5/091 455/41.2 |
| 2016/0239091 A1* | 8/2016 | Forutanpour | G06F 3/04842 |
| 2016/0253141 A1* | 9/2016 | Sarkar | G06F 1/1694 345/156 |
| 2016/0313769 A1* | 10/2016 | Yoshitani | G06F 1/1635 |
| 2016/0349708 A1* | 12/2016 | Lee | G04B 37/1486 |
| 2017/0186132 A1* | 6/2017 | Lee | G06F 1/1652 |
| 2017/0199712 A1* | 7/2017 | Lee | G06F 1/163 |
| 2018/0012568 A1* | 1/2018 | Kurata | G06F 1/163 |
| 2018/0054897 A1* | 2/2018 | Huitema | G06F 1/1652 |
| 2018/0103132 A1* | 4/2018 | Prushinskiy | G06F 1/1652 |
| 2018/0307301 A1* | 10/2018 | Lee | G06F 3/014 |
| 2018/0316783 A1* | 11/2018 | Ye | H04M 1/0245 |
| 2019/0139515 A1* | 5/2019 | Inagaki | G06F 3/046 |
| 2019/0180721 A1* | 6/2019 | Kim | G09G 5/38 |
| 2019/0302835 A1* | 10/2019 | Yamazaki | G06F 1/1635 |
| 2020/0133333 A1* | 4/2020 | Arshad | H04N 5/2253 |

\* cited by examiner

DISPLAY DEVICE

CROSS-REFERENCE TO RELATED APPLICATIONS

This application claims priority to Chinese patent application No. 201910473177. 6 filed on May 31, 2019, the disclosure of which is incorporated herein by reference in its entirety.

TECHNICAL FIELD

The present disclosure relates to display technology and, in particular, to a display device.

BACKGROUND

With the progress of display technology, flexible display technology has been greatly developed, and flexible display devices have been widely used.

However, the flexible display devices in the related art are merely used for displaying, that is, the flexible display devices merely implement functions such as bent screen displaying. The usage of the flexible display devices is singular. When the flexible display devices are not used for displaying, a great waste of resources exists.

SUMMARY

The present disclosure provides a display device to enable a flexible display component to have diversified functions.

The present disclosure provides a display device. The display device includes a watchcase, a first display screen and a flexible display component.

The first display screen is arranged on a front face of the watchcase. The first display screen includes a first display surface.

The flexible display component is arranged on a back face of the watchcase. The flexible display component may be bent along a first direction to be reused as a watchband. Moreover, in condition that the flexible display component is reused as the watchband, a surface of the flexible display component facing away from the watchcase is a second display surface.

DETAILED DESCRIPTION

The present disclosure will be further described in detail hereinafter in conjunction with the drawings and embodiments. It may be understood that the specific embodiments described herein are used only for interpreting the present disclosure and not for limiting the present disclosure. In addition, it should be noted that, for ease of description, the drawings only show a part related to the present disclosure, not the whole structure of the present disclosure.

Figure 1:
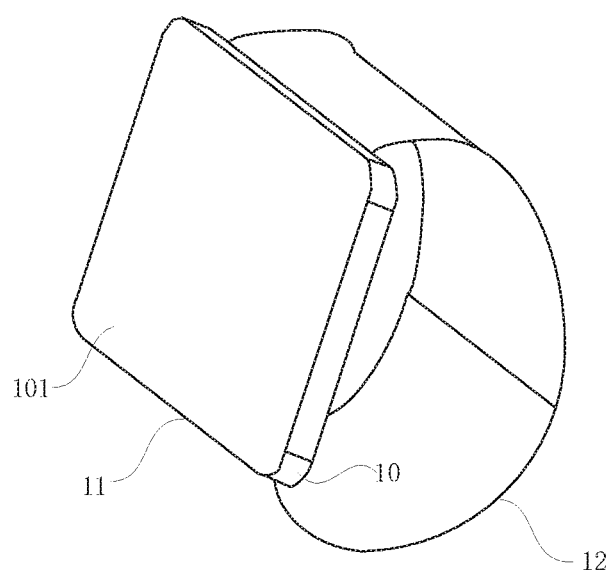
FIG. 1 is a structural diagram of a display device provided by an embodiment of the present disclosure.
Figure 2:
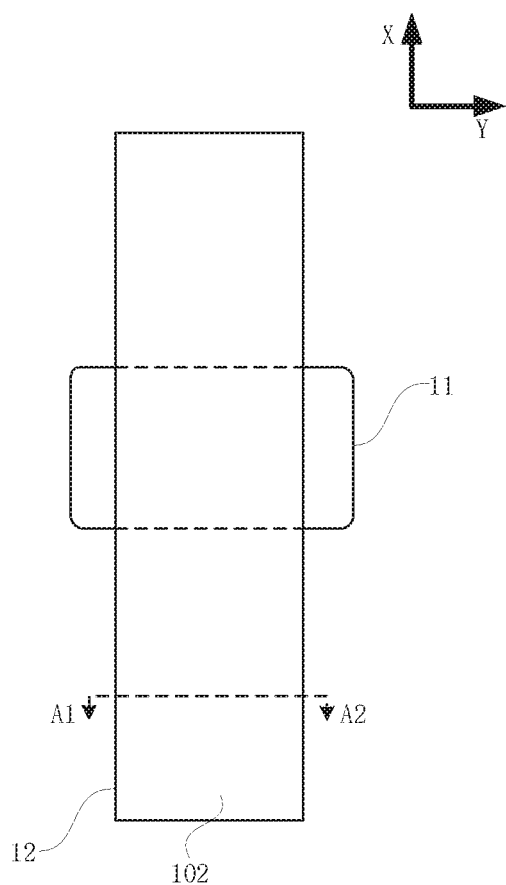
FIG. 2 is a structural diagram of the display device in FIG. 1 when the display device is unfolded.

FIG. 1 is a structural diagram of a display device provided by the embodiment of the present disclosure. FIG. 2 is a structural diagram of the display device in FIG. 1 when the display device is unfolded. Referring to FIG. 1 and FIG. 2, the display device includes a watchcase 10, a first display screen 11 and a flexible display component 12. The first display screen 11 is arranged on a front face of the watchcase 10. The first display screen 11 includes a first display surface 101. The flexible display component 12 is arranged on a back face of the watchcase 10. The flexible display component 12 may be bent along a first direction X to be reused as a watchband. Moreover, in condition that the flexible display component 12 is reused as the watchband, a surface of the flexible display component 12 facing away from the watchcase 10 is a second display surface 102.

For example, the first display surface 101 may be understood as a display surface of the display device in a watch mode. When the display device is used as a watch, the flexible display component 12 may be used as the watchband to fix the watch on a wrist of a user. At this time, the first display surface 101 is in display, and the second display surface 102 is not in display. However, when the display device is not used as the watch, the flexible display component 12 may be unfolded along the first direction X into a structure shown in FIG. 2. At this time, the surface of the flexible display component 12 facing away from the watchcase 10, that is, the second display surface 102 may be understood as the display surface of the display device in the cellphone mode, and the display device may be understood in a cellphone. The second display surface 102 is in display, and the first display surface 101 is not in display.

The technical solution of the embodiment adopts the display device including the watchcase, the first display screen and the flexible display component. The flexible display component may be reused as the watchband to enable the display device to be in the watch mode, or the flexible display component may be used for displaying to enable the display device to be in the cellphone mode. The display device may be switched between the watch mode and the cellphone mode, so that an application scope of the flexible display component is greatly expanded.

Figure 3:
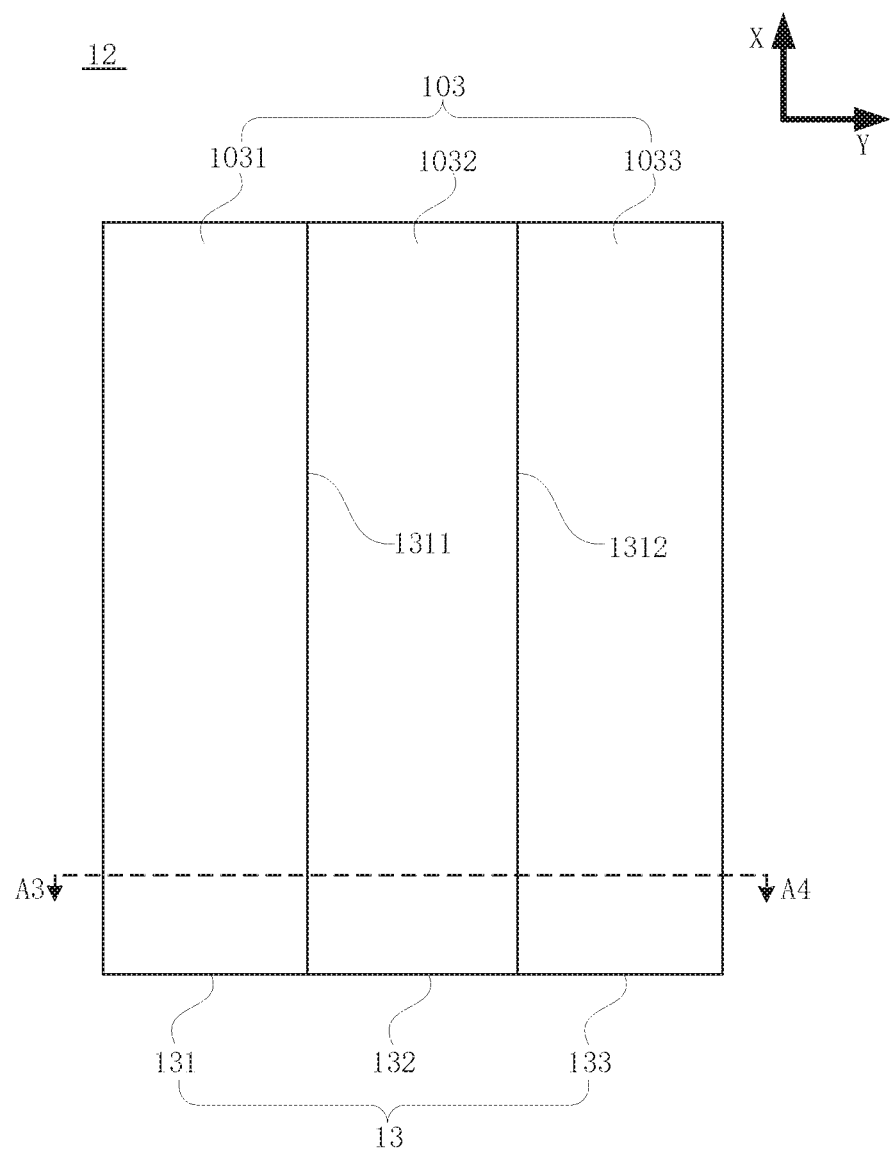
FIG. 3 is a structural diagram of another display device provided by the embodiment of the present disclosure.
Figure 4:
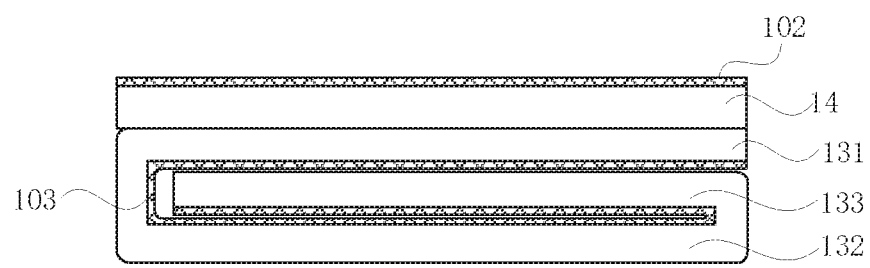
FIG. 4 is a cross sectional view of the display device in FIG. 2 taken along a line A1-A2.

Optionally, FIG. 3 is a structural diagram of another display device provided by the embodiment of the present disclosure. FIG. 4 is a cross sectional view of the display device in FIG. 2 taken along a line A1-A2. Referring to FIG. 3 and FIG. 4, the flexible display component 12 includes a second display screen 14 and a third display screen 13. The third display screen 13 is a foldable display screen and includes a first display part 131, a second display part 132 and a third display part 133 arranged in sequence along a second direction Y. The second display part 132 is bonded on the back face of the watchcase. A surface of the third display screen 13 facing away from the watchcase is a third display surface 103 when the third display screen 13 is unfolded. The second display screen 14 is configured on a non-display surface of the first display part 131 or a non-display surface of the third display part 133 opposite to the third display surface 103. The second direction Y is perpendicular to the first direction X.

The first display part 131 is foldable onto a display surface of the second display part 132 along a first intersection line 1311 between the first display part 131 and the second display part 132. The third display part 133 is foldable onto the display surface of the second display part 132 along a second intersection line 1312 between the third display part 133 and the second display part 132. Moreover, in condition that both the first display part 131 and the third display part 133 are folded onto the display surface of the second display part 132, the flexible display component 12 is reused as the watchband.

Specifically, when the flexible display component 12 is unfolded along the second direction Y, a mode where the display device in may be understood as a tablet mode. A display surface 1031 of the first display part 131, a display surface 1032 of the second display part 132 and a display surface 1033 of the third display part 133 constitute the third display surface 103. An area of the third display surface 103 is larger than both an area of the first display surface 101 and an area of the second display surface 102, which facilitates the user to conduct operations such as watching video.

For example, referring to FIG. 4, the second display screen 14 is configured on the non-display surface of the first display part 131 opposite to the third display surface. When the display device is not required to be used in the tablet mode, the third display part 133 may be first folded onto the display surface of the second display part 132 along the second intersection line, and then the first display part 131 may be first folded onto the display surface of the second display part 132 along the first intersection line. At this time, the second display screen 14 is located at an outermost side of the flexible display component along a direction facing away from the watchcase, that is, the flexible display component may be used as the watchband, or be used for displaying. If the first display part 131 is first folded onto the display surface of the second display portion 132 and then the third display part 133 is folded onto the display surface of the second display part 132, a display surface of the second display screen 14 will be shielded by the third display part 133. This affects the display of the second display screen 14. At this time, however, the flexible display component may still be used as the watchband. In the embodiment of the present disclosure, a folding order between the first display part 131 and the third display part 133 is not limited.

Figure 5:
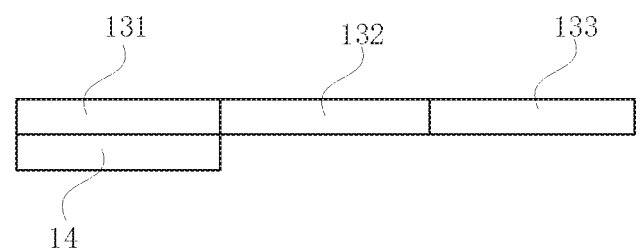
FIG. 5 is a cross sectional view of the display device in FIG. 3 taken along a line A3-A4.
Figure 6:
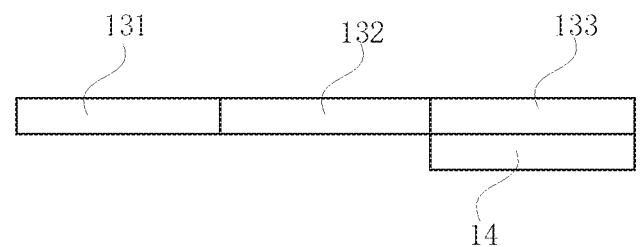
FIG. 6 is another cross sectional view of the display device in FIG. 3 taken along the line A3-A4.

For example, FIG. 5 is a cross sectional view of the display device in FIG. 3 taken along a line A3-A4. FIG. 6 is another cross sectional view of the display device in FIG. 3 taken along the line A3-A4. Referring to FIG. 5 and FIG. 6, the second display screen 14 may be configured on the non-display surface of the first display part 131 facing away from the third display surface, or may be configured on the non-display surface of the third display part 133 facing away from the third display surface. When the second display screen 14 is configured on the non-display surface of the third display part 133 facing away from the third display surface, specific usage of the display device is similar to that of the display device when the second display screen 14 is configured on the non-display surface of the first display part 131 facing away from the third display surface, and is not repeated herein.

Figure 7:
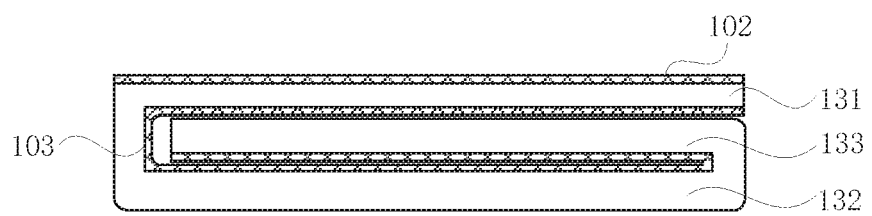
FIG. 7 is another cross sectional view of the display device in FIG. 2 taken along the line A1-A2.

Optionally, FIG. 7 is another cross sectional view of the display device in FIG. 2 taken along the line A1-A2. Referring to FIG. 3 and FIG. 7, the flexible display component includes the third display screen 13. The third display screen 13 is a foldable display screen and includes the first display part 131, the second display part 132 and the third display part 133 arranged in sequence along the second direction Y. The second display part 132 is bonded to the back face of the watchcase. The first display part 131 or the third display part 133 of the flexible display component 12 is a transparent display panel. The second direction Y is perpendicular to the first direction X. The surface of the third display screen 13 facing away from the watchcase is the third display surface 103 when the third display screen 13 is unfolded. The surface of the first display part 131 or the surface of the third display part 133 facing away from the third display surface 103 is the second display surface.

The first display part 131 is foldable onto the display surface of the second display part 132 along the first intersection line 1311 between the first display part 131 and the second display part 132. The third display part 133 is foldable onto the display surface of the second display part 132 along the second intersection line 1312 between the third display part 133 and the second display part 132. Moreover, in the condition that both the first display part 131 and the third display part 133 are folded onto the display surface of the second display part 132, the flexible display component 12 is reused as the watchband.

For example, referring to FIG. 7, the first display part 131 of the third display screen 13 in the flexible display component may be configured to be the transparent display panel. When the display device is used in the cellphone mode, the transparent display panel is folded to an outermost side of the flexible display component facing away from the watchcase. At this time, the first display part 131 may be controlled to display, and the user may watch the displayed content through a back face of the transparent display panel, so that the cellphone mode of the display device and the configuration of the transparent display panel are implemented. When the display device is used in the cellphone mode, the flexible display component is small in thickness and convenient to carry.

Figure 8:
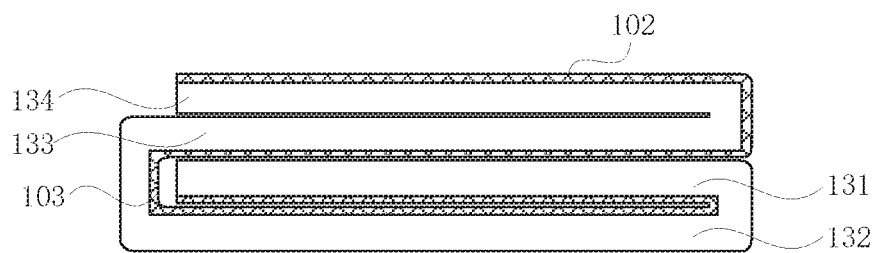
FIG. 8 is another cross sectional view of the display device in FIG. 2 taken along the line A1-A2.
Figure 9:
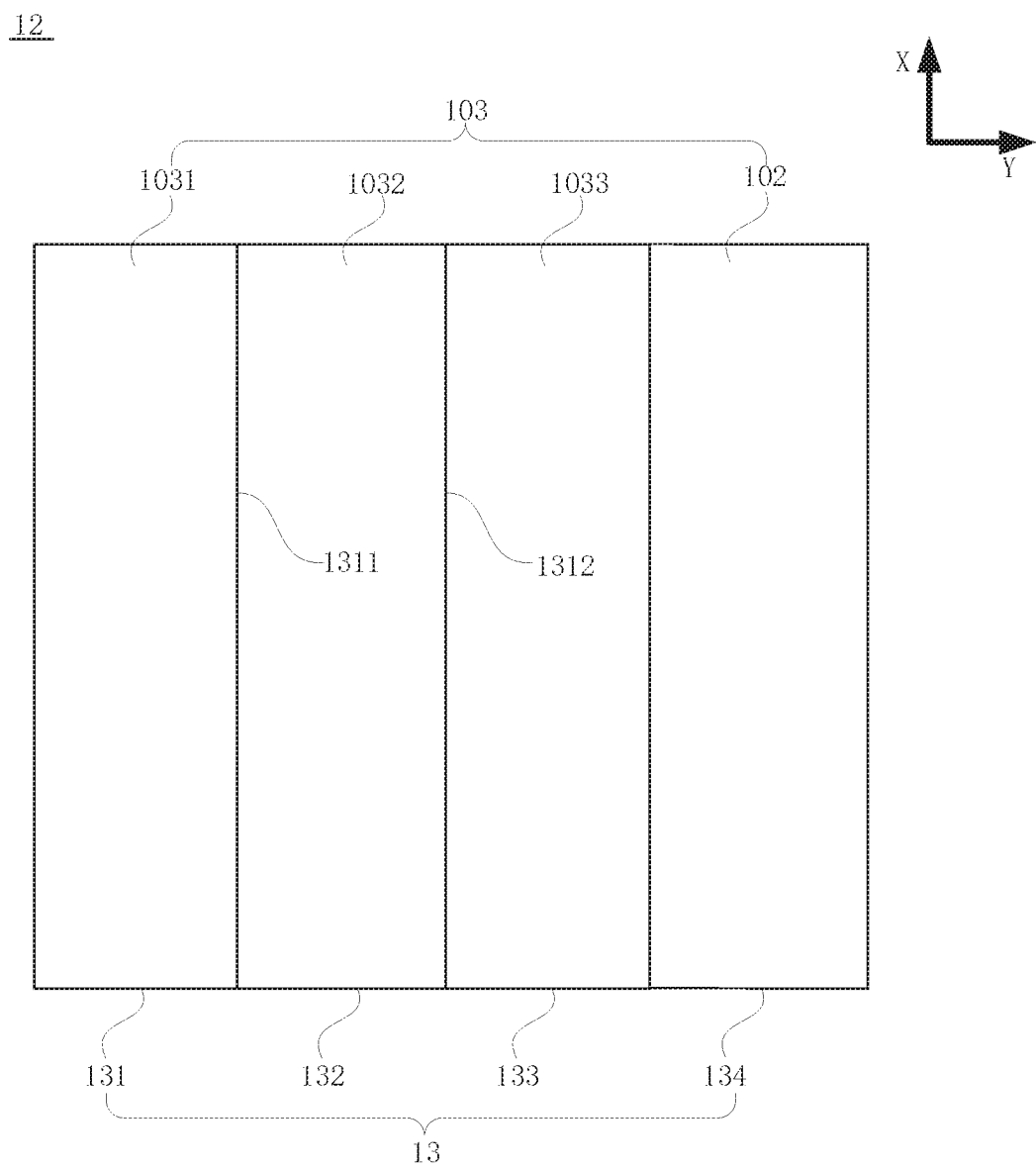
FIG. 9 is a structural diagram of another display device provided by the embodiment of the present disclosure.

Optionally, FIG. 8 is another cross sectional view of the display device in FIG. 2 taken along the line A1-A2. FIG. 9 is a structural diagram of another display device provided by the embodiment of the present disclosure. FIG. 8 corresponds to FIG. 9. Referring to FIG. 8 and FIG. 9, the flexible display component 12 includes the third display screen 13. The third display screen 13 is a foldable display screen and includes the first display part 131, the second display part 132, the third display part 133 and a fourth display part 134 arranged in sequence along the second direction Y. The second display part 132 is bonded to the back face of the watchcase. The second direction Y is perpendicular to the first direction X. When the third display screen 13 is unfolded, the surface of the third display screen 13 facing away from the watchcase is the third display surface 103.

In the condition that the fourth display part 134 is folded onto the non-display surface of the third display part 133 along an intersection line between the fourth display part 134 and the third display part 133, a portion of the third display surface 103 at the fourth display part 134 is reused as the second display surface 102. The first display part 131 is foldable onto the display surface of the second display part 132 along an intersection line 1311 between the first display part 131 and the second display part 132. The third display part 133 is foldable onto the display surface of the second display part 132 along an intersection line 1312 between the third display part 133 and the second display part 132. Moreover, in the condition that both the first display part 131 and the third display part 133 are folded onto the display surface of the second display part 132, the flexible display component 12 is reused as the watchband.

Specifically, the third display screen 13 may be a one-piece screen divided into four parts, namely, the first display part 131, the second display part 132, the third display part 133, and the fourth display part 134. When being used in the tablet mode, the display device may have a larger display surface. At the same time, when the display device is used in the cellphone mode, the third display screen is foldable into a structure shown in FIG. 8, that is, the first display part 131 is first folded onto the display surface of the second display part 132, the third display part 133 is then folded onto the display surface of the second display part 132, and finally the fourth display part 134 is folded onto the non-display surface of the third display part 133. At this time, the display surface of the fourth display part 134 is located at the outermost side of the flexible display component. In addition, a chip may be used for completing the display of the display device in the cellphone mode and the tablet mode. In the tablet mode, the chip controls the first display part 131, the second display part 132, the third display part 133 and the fourth display part 134 to display. However, in the cellphone mode, the chip only controls the fourth display part 134 to display. Since only one chip is required to complete the display function in the cellphone mode and the tablet mode, the cost of the display device is reduced.

Optionally, a size of the first display part, a size of the second display part and a size of the third display part are the same. Through configuring the size of the first display part, a size of the second display part and a size of the third display part to be the same, the folded edge is tidy after the flexible display component is folded. This avoids damage to partial area of the flexible display component due to untidy edge, so as to avoid an effect on the display of the display device.

Figure 10:
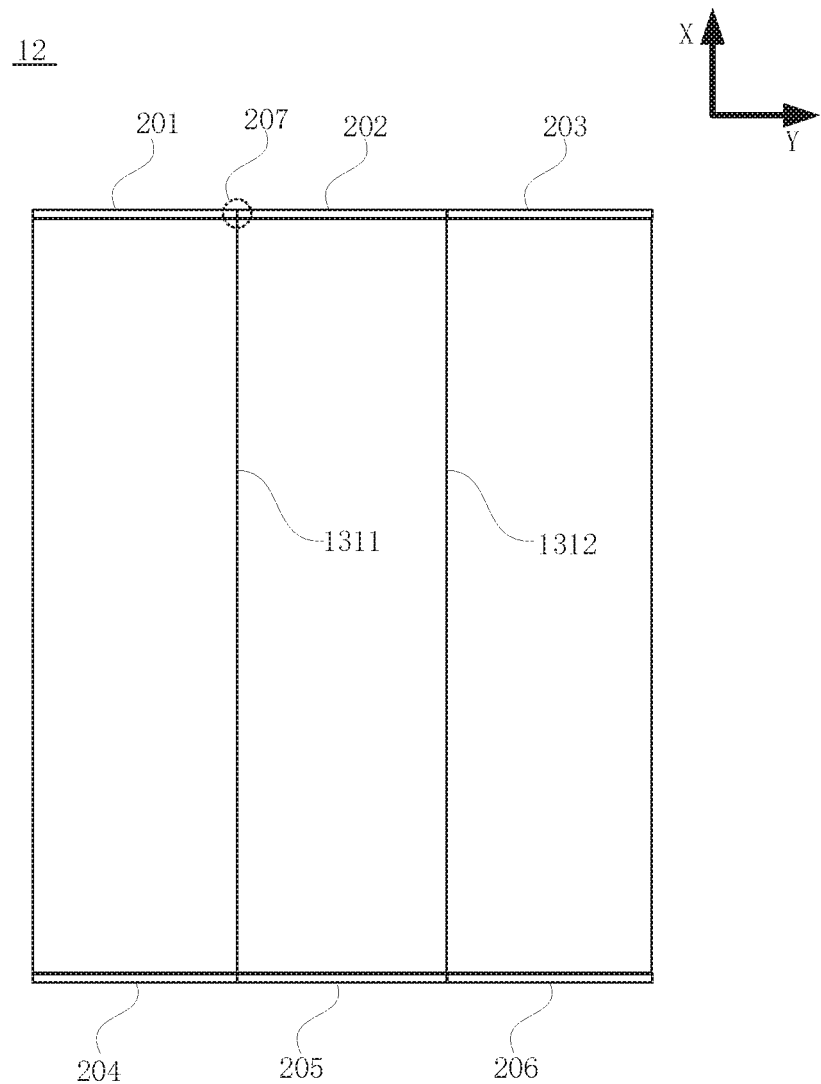
FIG. 10 is a structural diagram of another display device provided by the embodiment of the present disclosure.
Figure 11:
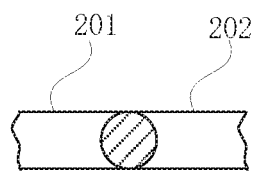
FIG. 11 is an enlarged diagram of a portion of the display device in FIG. 10.

Optionally, FIG. 10 is a structural diagram of another display device provided by the embodiment of the present disclosure. FIG. 11 is an enlarged diagram of a portion of the display device in FIG. 10. FIG. 11 corresponds to an area 207 of the display device in FIG. 10. Referring to FIG. 10 and FIG. 11, in a direction parallel to the second direction, a first support strip 201 is configured at a first side of the first display part. A second support strip 202 is configured at a first side of the second display part. A third support strip 203 is configured at a first side of the third display part. The first side of the first display part, the first side of the second display part and the first side of the third display part are all located in a first side of the third display screen along the first direction X. The first support strip 201 is hinged with the second support strip 202, and the third support strip 203 is hinged with the second support strip 202.

Alternatively, a fourth support strip 204 is configured at a second side of the first display part. A fifth support strip 205 is configured at a second side of the second display part. A sixth support strip 206 is configured at a second side of the third display part. The second side of the first display part, the second side of the second display part and the second side of the third display part are all located in a second side of the third display screen along the first direction X opposite to the first side of the third display screen. The fourth support strip 204 is hinged with the fifth support strip 205, and the sixth support strip 206 is hinged with the fifth support strip 205.

Specifically, when the display device is used in the tablet mode, since the first support strip 201 is hinged with the second support strip 202, the first display part and the second display part may be easily unfolded. After the first display part and the second display part are unfolded, the first support strip and the second support strip are fixed through a hinge, so that the first display part and the second display part are supported. When the first display part and the second display part are required to be folded, the first support strip and the second support strip may be conveniently folded together through the hinge, so that ease of use of the display device is greatly improved.

Figure 12:
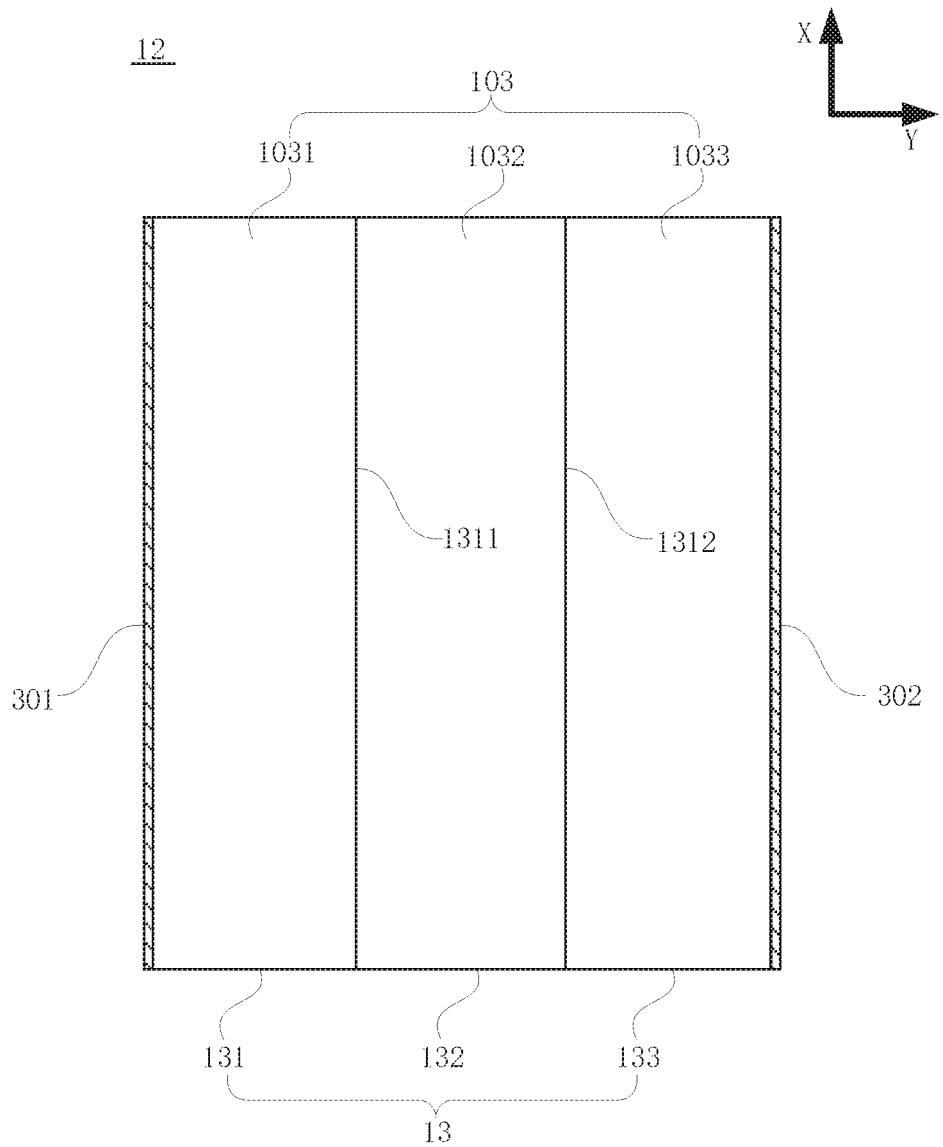
FIG. 12 is a structural diagram of another display panel provided by the embodiment of the present disclosure.
Figure 13:
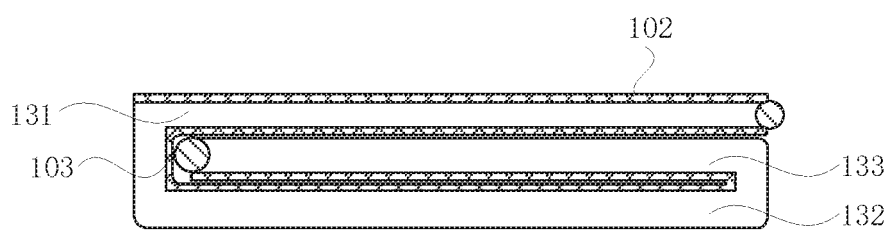
FIG. 13 is a structural diagram of the display device in FIG. 12 after being folded.

Optionally, FIG. 12 is a structural diagram of another display panel provided by the embodiment of the present disclosure. FIG. 13 is a structural diagram of the display device in FIG. 12 after being folded. Referring to FIG. 12 and FIG. 13, a first metal support 301 is configured at a side of the first display part 131 facing away from the second display part 132. A second metal support 302 is configured at a side of the third display part 133 facing away from the second display part 132. Materials of the first metal support 301 and the second metal support 302 are memory metal.

Specifically, when the flexible display component 12 is unfolded along the first direction X, the first metal support 301 and the second metal support 302 are changed from a bent state to a straight state. In addition, materials of the first metal support 301 and the second metal support 302 are selected to be memory metal, so that the first metal support 301 and the second metal support 302 may be automatically changed from the bent state to the straight state, and the flexible display component is changed from the bent state to the straight state. Thus, the user may conveniently conduct operations such as touch control.

Figure 14:
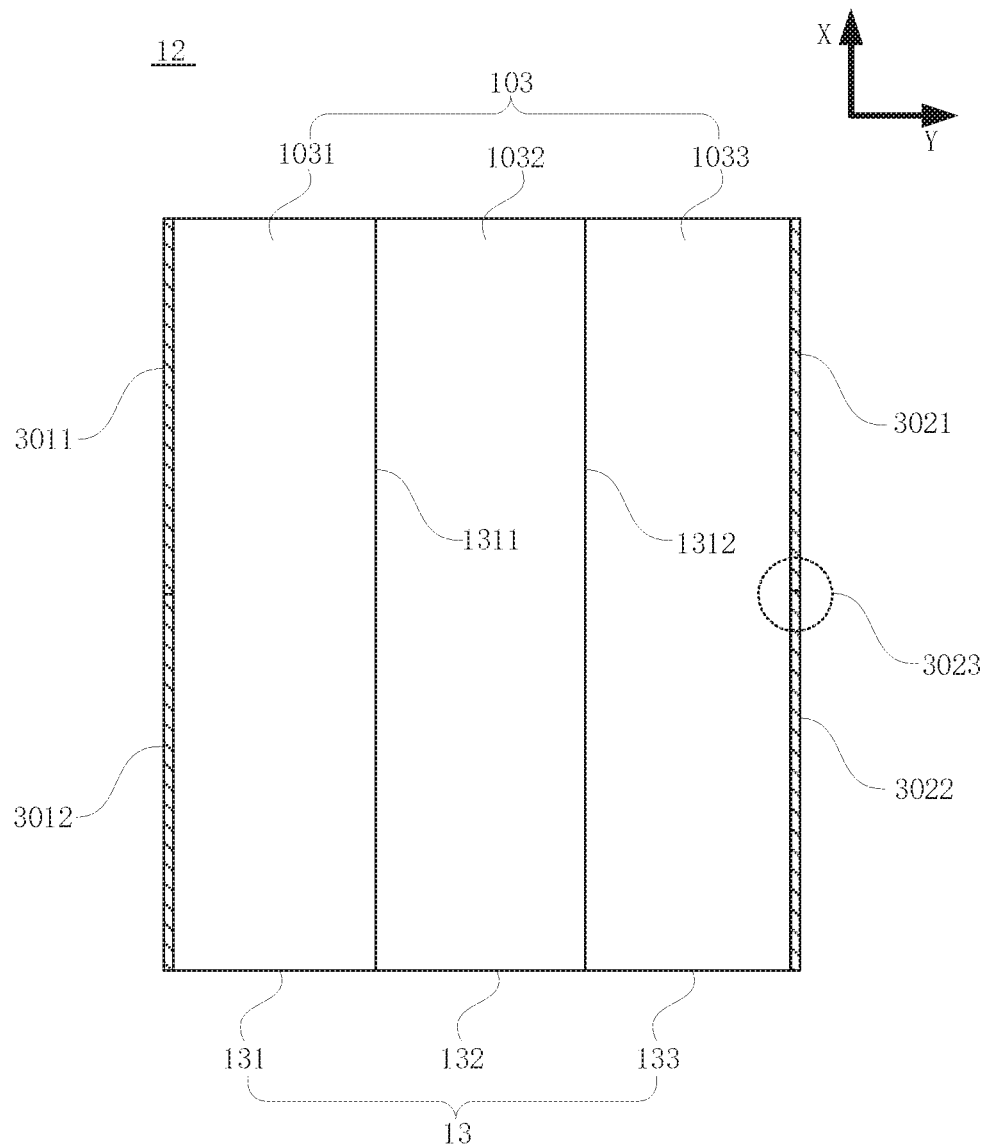
FIG. 14 is a structural diagram of another display panel provided by the embodiment of the present disclosure.
Figure 15:
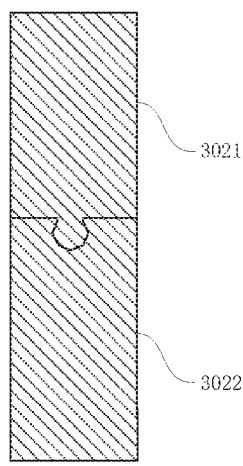
FIG. 15 is an enlarged diagram of a portion of the display device in FIG. 14.

Optionally, FIG. 14 is a structural diagram of another display panel provided by the embodiment of the present disclosure. FIG. 15 is an enlarged diagram of a portion of the display device in FIG. 14. Referring to FIG. 14 and FIG. 15, the first metal support includes a first support part 3011 and a second support part 3012. A first end of the first support part 3011 and a first end of the second support part 3012 are in movable connection to a side of the first display part. A second end of the first support part 3011 is in detachable connection to a second end of the second support part 3012. Moreover, in the condition that the second end of the first support part 3011 is in connection to the second end of the second support part 3012, the first metal support is attached to the side of the first display part.

The second metal support includes a third support part 3021 and a fourth support part 3022. A first end of the third support part 3021 and a first end of the fourth support part 3022 are in movable connection to a side of the third display part. A second end of the third support part 3021 is in detachable connection to a second end of the fourth support part 3022. Moreover, in the condition that the second end of the third support part 3021 is in connection to the second end of the fourth support part 3022, the second metal support is attached to the side of the third display part.

A plurality of connection parts are configured on the watchcase. The plurality of connection parts are configured to be in fixed connection to the second end of the first support part 3011, the second end of the second support part 3012, the second end of the third support part 3021 and the second end of the fourth support part 3022 respectively when the third display screen is unfolded.

Specifically, an enlarged diagram of a joint 3023 between the third support part 3021 and the fourth support part 3022 is shown in FIG. 15. A convex portion may be configured on the third support part 3021, and a concave portion may be configured on the fourth support part 3022. When the display device is used as the tablet, the first support part 3011 and the second support part 3012 are separated, the third support part 3021 and the fourth support part 3022 are separated, and the second end of the first support portion 3011, the second end of the second support portion 3012, the second end of the third support portion 3021 and the second end of the fourth support portion 3022 are respectively fixed to corresponding joints on the watchcase. Thus, the third display screen is supported by acting force along the first direction X and the second direction Y in the tablet mode, which is more convenient for the user to conduct the operations such as the touch control.

Figure 16:
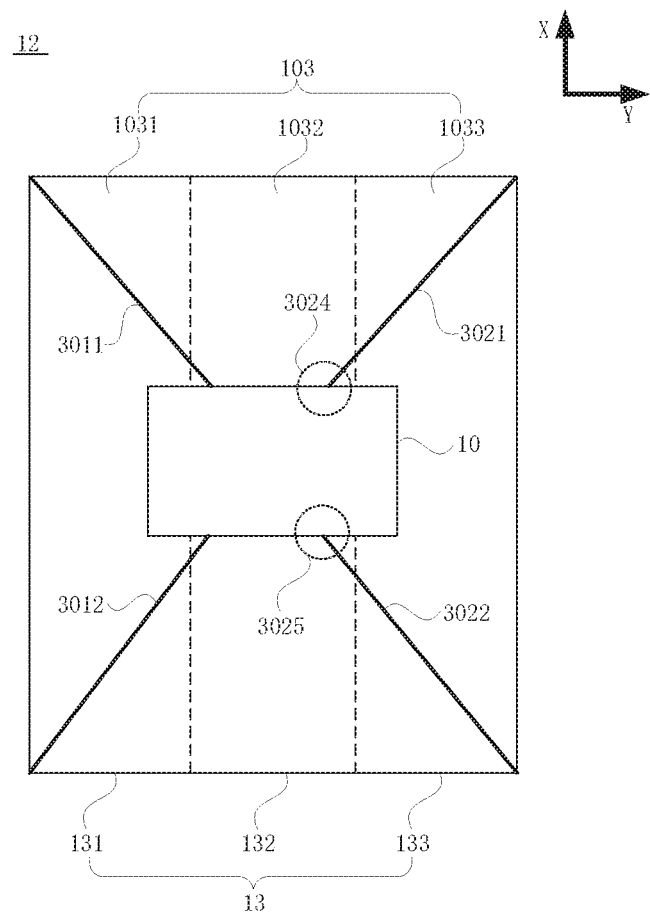
FIG. 16 is a structural diagram of another display device provided by the embodiment of the present disclosure.
Figure 17:
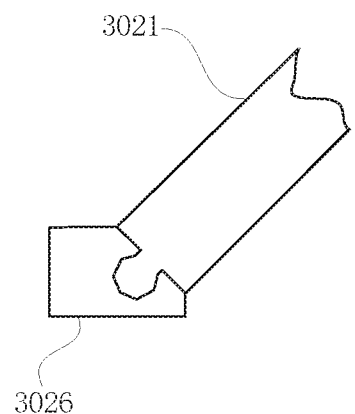
FIG. 17 is an enlarged diagram of a portion of the display device in FIG. 16.
Figure 18:
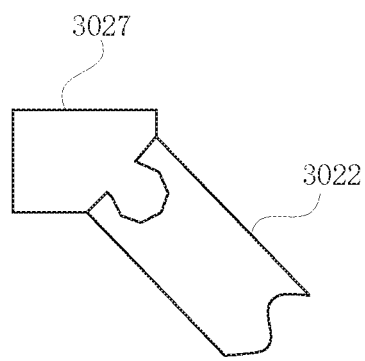
FIG. 18 is another enlarged diagram of a portion of the display device in FIG. 16.

Illustratively, FIG. 16 is a structural diagram of another display device provided by the embodiment of the present disclosure. Referring to FIG. 16, the second end of the first support portion 3011, the second end of the second support portion 3012, the second end of the third support portion 3021 and the second end of the fourth support portion 3022 are fixed on the watchcase to provide support for the third display screen, so that the operations such as the touch control on the third display screen are conveniently conducted. FIG. 17 is an enlarged diagram of a portion of the display device in FIG. 16. FIG. 17 corresponds to an area 3024 of the display device in FIG. 16. A joint 3026 on the watchcase matches with the third support part 3021, so that the third support part 3021 may be in fixed connection to the joint on the watchcase. FIG. 18 is another enlarged diagram of a portion of the display device in FIG. 16. The fourth support part 3022 matches with a joint 3027 on the watchcase, so that the fourth support part 3022 may be in fixed connection to the joint on the watchcase.

Figure 19:
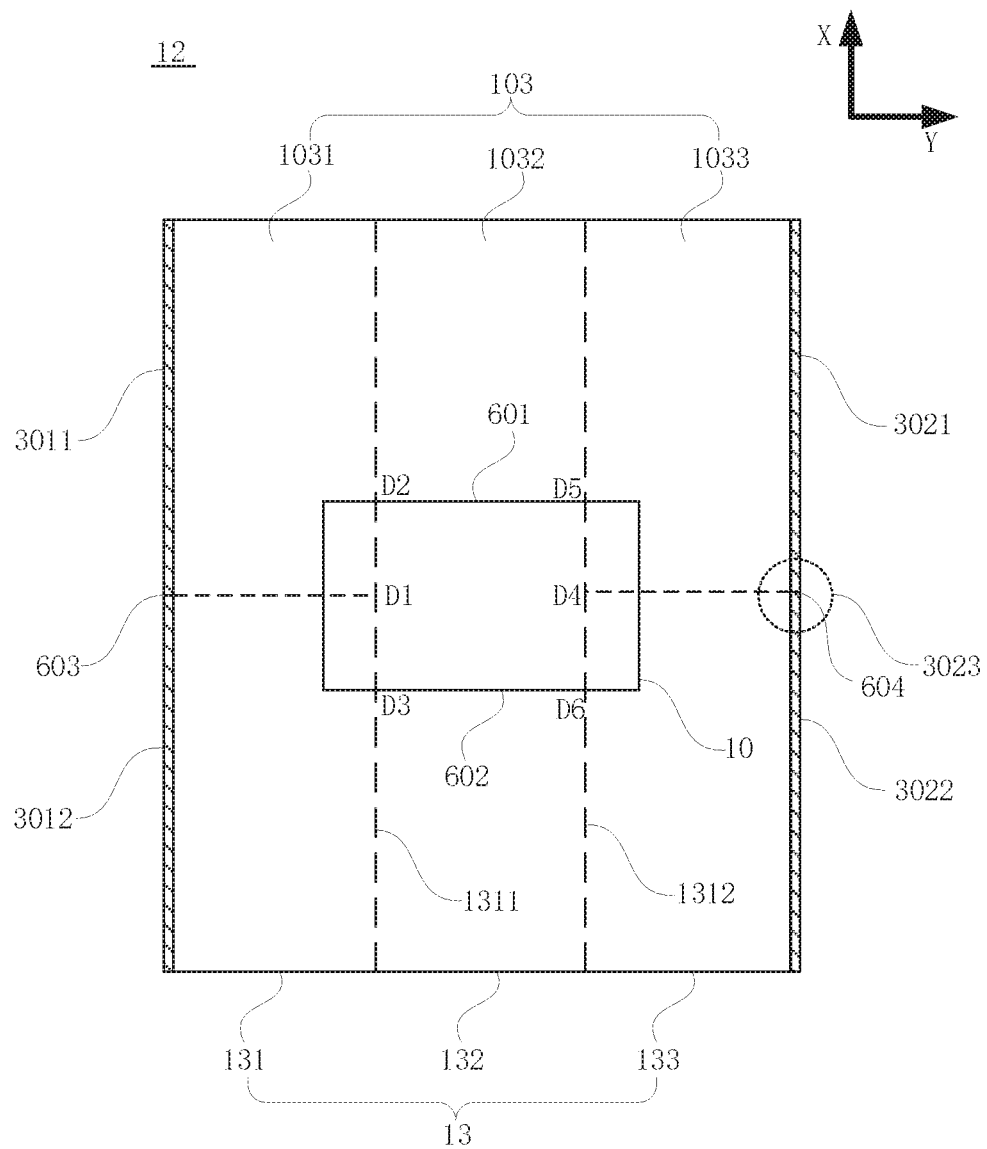
FIG. 19 is a structural diagram of another display device provided by the embodiment of the present disclosure.

Optionally, FIG. 19 is a structural diagram of another display device provided by the embodiment of the present disclosure. Referring to FIG. 19, the back face of the watchcase includes a first side 601 and a second side 602 opposite to the first side 601. The first side 601 and the second side 602 in the back face of the watchcase are parallel to the second direction Y. A projection D1 of a joint 603 between the first support part 3011 and the second support part 3012 on the first intersection line 1311 along the second direction Y is located between a projection D2 of the first side 601 on the first intersection line 1311 and a projection D3 of the second side 602 on the first intersection line 1311. At the same time, a projection D4 of a joint 604 between the third support part 3021 and the fourth support part 3022 on the second intersection line 1312 is located between a projection D5 of the first side 601 on the second intersection line 1312 and a projection D6 of the second side 602 on the second intersection line 1312.

Specifically, after the first display part 131 is folded onto the display surface of the second display part 132 along the first intersection line 1311, the joint between the first support part 3011 and the second support part 3012 is located between a straight line where a first side of the watchcase is located at and a straight line where a second side of the watchcase is located at. When the flexible display component is bent, the joint between the first support part 3011 and the second support part 3012 is not affected by bending force, so as to avoid the first support part 3011 and the second support part 3012 from being disconnected in the cellphone mode or the watch mode and to avoid an effect on the usage of the display device.

Figure 20:
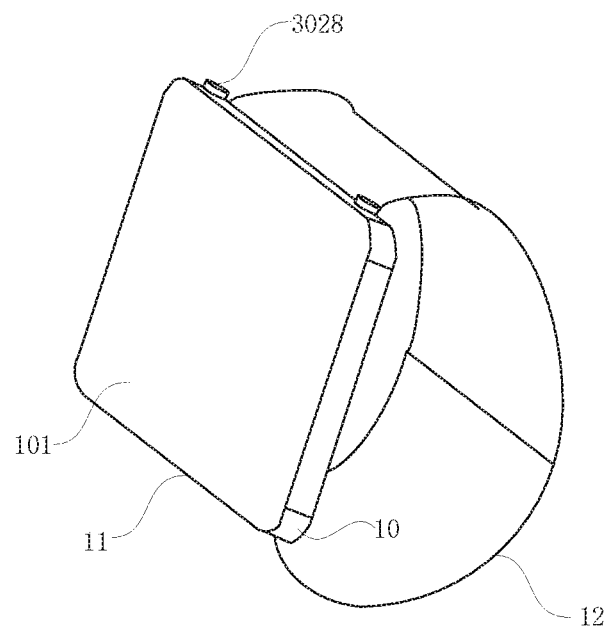
FIG. 20 is a structural diagram of another display device provided by the embodiment of the present disclosure.

Optionally, referring to FIG. 20, FIG. 20 is a structural diagram of another display device provided by the embodiment of the present disclosure. Referring to FIG. 20, a plurality of function keys 3028 are configured on the watchcase, and the plurality of function keys 3028 are reused as the plurality of connection parts.

Specifically, the plurality of function keys 3028 may be keys having a power on/off function or a volume adjustment function. In addition, structures matching with support parts (the first support part, the second support part, the third support part and the fourth support part) to be connected are configured on the plurality of function keys 3028, so that when the display device is in the tablet mode, the plurality of function keys 3028 may be in fixed connection to the support parts to increase usage efficiency of the plurality of function keys 3028.

Figure 21:
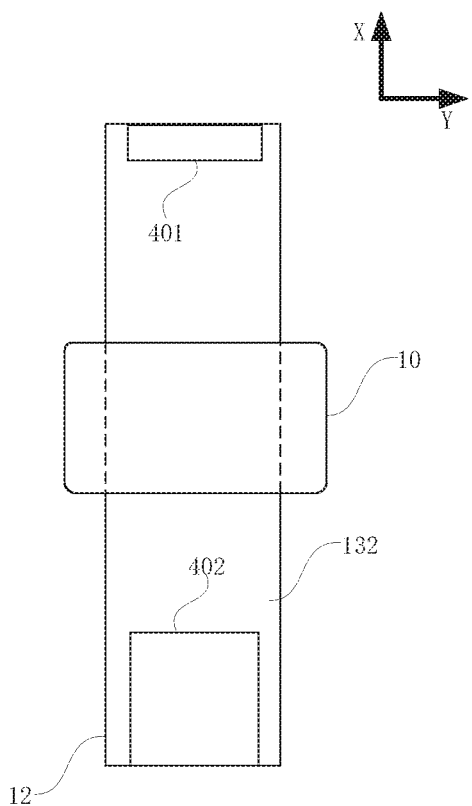
FIG. 21 is a structural diagram of another display device provided by the embodiment of the present disclosure.

Optionally, FIG. 21 is a structural diagram of another display device provided by the embodiment of the present disclosure. Referring to FIG. 21, a first magnetic bonding part 401 is configured on the non-display surface of the second display part 132. A second magnetic bonding part 402 matching with the first magnetic bonding part 401 is configured on the non-display surface of the second display part 132. The second magnetic bonding part 402 is disposed at an end of the second display part 132 in the first direction X. In the condition that the flexible display component is reused as the watchband, the first magnetic bonding part 401 and the second magnetic bonding part 402 attract and overlap each other.

Specifically, the first magnetic bonding part 401 may be configured at an end of the non-display surface of the second display part, and the second magnetic bonding part 402 may be configured on an area of the non-display surface of the second display part other than the first magnetic bonding part 401. When the flexible display component is wound on the wrist of the user to be used as the watchband, high comfort level of different users may be guaranteed.

Figure 22:
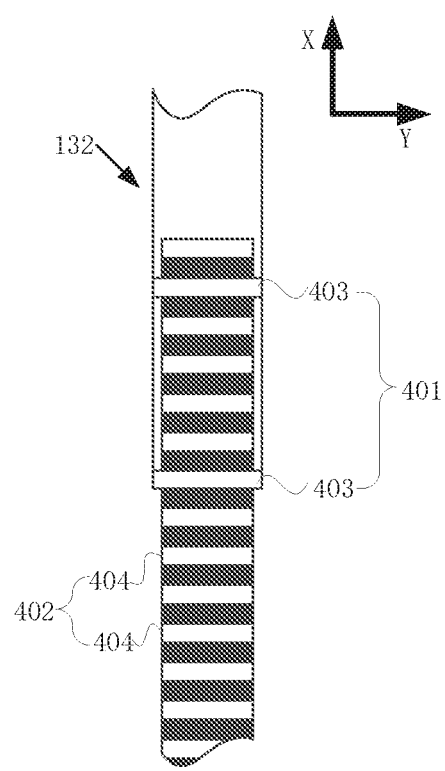
FIG. 22 is a structural diagram of another display device provided by the embodiment of the present disclosure.
Figure 23:
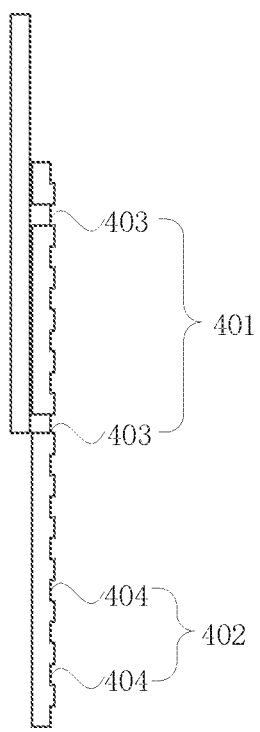
FIG. 23 is a side view of the display device in FIG. 22.

Optionally, FIG. 22 is a structural diagram of another display device provided by the embodiment of the present disclosure. FIG. 23 is a side view of the display device in FIG. 22. Referring to FIG. 22 and FIG. 23, a first buckle part 401 is configured on the non-display surface of the second display part 132, and the first buckle part 401 is disposed at a first end of second display part 132 in the first direction X. A second buckle part 402 matching with the first buckle part 401 is configured on the non-display surface of the second display part 132, and the second buckle part 402 is disposed at a second end of second display part in the first direction X opposite to the first end of the second display part.

Illustratively, the first buckle part 401 includes at least one cingulum 403 straddling the second display part. The second buckle part 402 includes a plurality of grooves 404. The at least one cingulum 403 is configured to pass through a second end of the second display part 132, and a second end of the folded third display screen is buckled into the at least one cingulum 403 through the plurality of grooves 404. Both the at least one cingulum 403 and the plurality of grooves 404 are configured on the non-display surface of the second display part 132. When the display device is used in the cellphone mode, the display of the display device in the cellphone is not affected. In addition, the at least one cingulum 403 may be made of a soft material, such as plastic or rubber, so as to avoid an edge of the flexible display component to be greatly extruded after the folded third display screen is buckled into the at least one cingulum 403, and to avoid damage to the flexible display component.

Figure 24:
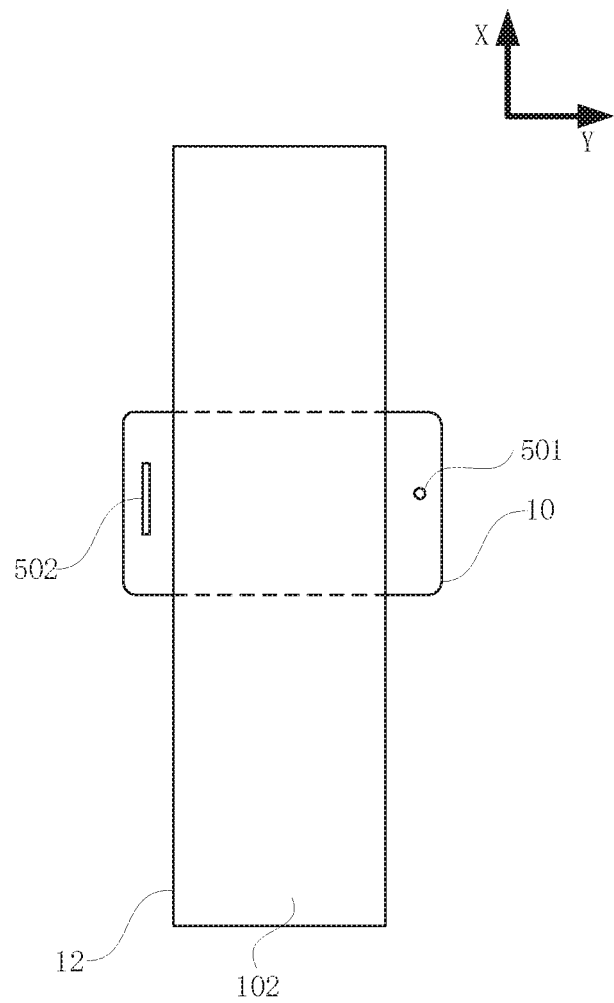
FIG. 24 is a structural diagram of another display device provided by the embodiment of the present disclosure.

FIG. 24 is a structural diagram of another display device provided by the embodiment of the present disclosure. Referring to FIG. 24, in the condition that both the first display part and the third display part are folded onto the display surface of the second display part, an unoverlapped area exists between the watchcase 10 and the flexible display component 12. A function module is configured at the back face of the watchcase in the unoverlapped area.

For example, the function module includes a camera 501 and/or a handset 502. The camera 501 may be used as a camera device in the cellphone mode, and the handset 502 may be used as an audio component in the cellphone mode, so that requirements such as acquiring images and playing sound in the cellphone mode are met. In addition, the watchcase may further include function components such as microphone to provide better functions for the display device.

Optionally, a main circuit board is configured at an interior of the watchcase. The main circuit board is configured to control image display of the first display screen and the flexible display component.

Specifically, the first display screen and the flexible display component may share one main circuit board, so that the display device is easier to be controlled, and integration level of an internal control circuit of the display device is higher. This is advantageous to reduce the volume and cost of the display device.

Optionally, the first display surface is a watch display surface, the second display surface is a cellphone display surface, and the third display surface is a tablet computer display surface.

It should be noted that the above are only better embodiments of the present disclosure and technical principles applied in the present disclosure. Those skilled in the art will understand that the present disclosure is not limited to the specific embodiments described herein. For those skilled in the art, varies obvious changes, readjustments and substitutions may be conducted without falling outside the protection scope of the present disclosure. Therefore, although the present disclosure is described in detail through the above embodiments. Without departing from the conception of the present disclosure, the present disclosure may include more equivalent embodiments. The scope of the present disclosure is determined by the scope of accompanying claims.

What is claimed is:

1. A display device, comprising:
a watchcase;
a first display screen, which is arranged on a front face of the watchcase, wherein the first display screen comprises a first display surface; and
a flexible display component, which is arranged on a back face of the watchcase, wherein the flexible display component is bendable along a first direction to be reused as a watchband, and in condition that the flexible display component is reused as the watchband, a surface of the flexible display component facing away from the watchcase is a second display surface.

2. The display device of claim 1, wherein the flexible display component comprises a third display screen;
wherein the third display screen is a foldable display screen, the third display screen comprises a first display part, a second display part and a third display part arranged in sequence along a second direction, wherein the second display part is bonded on the back face of the watchcase, wherein a surface of the third display screen facing away from the watchcase is a third display surface when the third display screen is unfolded, and wherein the second direction is perpendicular to the first direction.

3. The display device of claim 2, wherein the flexible display component comprises a second display screen, wherein the second display screen is configured on a non-display surface of the first display part or a non-display surface of the third display part opposite to the third display surface;
wherein the first display part is foldable onto a display surface of the second display part along a first intersection line between the first display part and the second display part, the third display part is foldable onto the display surface of the second display part along a second intersection line between the third display part and the second display part, and in condition that both the first display part and the third display part are folded onto the display surface of the second display part, the flexible display component is reused as the watchband.

4. The display device of claim 2, wherein the first display part or the third display part of the flexible display component is a transparent display panel, a surface of the first display part or a surface of the third display part facing away from the third display surface is the second display surface;
wherein the first display part is foldable onto a display surface of the second display part along a first intersection line between the first display part and the second display part, the third display part is foldable onto the display surface of the second display part along a second intersection line between the third display part and the second display part, and in condition that both the first display part and the third display part are folded onto the display surface of the second display part, the flexible display component is reused as the watchband.

5. The display device of claim 2, wherein the third display screen further comprises a fourth display part, and the first display part, the second display part, the third display part and the fourth display part arranged in sequence along the second direction;
in a condition that the fourth display part is folded onto a non-display surface of the third display part along an intersection line between the fourth display part and the third display part, a portion of the third display surface at the fourth display part is reused as the second display surface, the first display part may is foldable onto a display surface of the second display part along an intersection line between the first display part and the second display part, the third display part is foldable onto the display surface of the second display part along an intersection line between the third display part and the second display part, and in condition that both the first display part and the third display part are folded onto the display surface of the second display part, the flexible display component is reused as the watchband.

6. The display device of claim 2, wherein a size of the first display part, a size of the second display part and a size of the third display part are the same.

7. The display device of claim 2, wherein
in a direction parallel to the second direction, a first support strip is configured at a first side of the first display part, a second support strip is configured at a first side of the second display part, a third support strip is configured at a first side of the third display part, wherein the first side of the first display part, the first side of the second display part and the first side of the third display part are all located in a first side of the third display screen along the first direction, wherein the first support strip is hinged with the second support strip, and wherein the third support strip is hinged with the second support strip; and/or
in a direction parallel to the second direction, a fourth support strip is configured at a second side of the first display part, a fifth support strip is configured at a second side of the second display part, a sixth support strip is configured at a second side of the third display part, wherein the second side of the first display part, the second side of the second display part and the second side of the third display part are all located in a second side of the third display screen along the first direction opposite to the first side of the third display screen, wherein the fourth support strip is hinged with the fifth support strip, and wherein the sixth support strip is hinged with the fifth support strip.

8. The display device of claim 2, wherein a first metal support is configured at a side of the first display part facing away from the second display part, a second metal support is configured at a side of the third display part facing away from the second display part, and materials of the first metal support and the second metal support are memory metal.

9. The display device of claim 8, wherein the first metal support comprises a first support part and a second support part, wherein a first end of the first support part and a first end of the second support part are in movable connection to a side of the first display part, a second end of the first support part is in detachable connection to a second end of the second support part, and in condition that the second end of the first support part is in connection to the second end of the second support part, the first metal support is attached to the side of the first display part;
wherein the second metal support comprises a third support part and a fourth support part, wherein a first end of the third support part and a first end of the fourth support part are in movable connection to a side of the third display part, a second end of the third support part is in detachable connection to a second end of the fourth support part, and in condition that the second end of the third support part is in connection to the second end of the fourth support part, the second metal support is attached to the side of the third display part;
wherein a plurality of connection parts are configured on the watchcase, and the plurality of connection parts are configured to be in fixed connection to the second end of the first support part, the second end of the second support part, the second end of the third support part and the second end of the fourth support part respectively when the third display screen is unfolded.

10. The display device of claim 9, wherein the back face of the watchcase comprises a first side and a second side opposite to the first side;
wherein the first side and the second side are parallel to the second direction, a projection of a joint between the first support part and the second support part on the first intersection line along the second direction is located between a projection of the first side on the first intersection line and a projection of the second side on the first intersection line, and a projection of a joint between the third support part and the fourth support part on the second intersection line along the second direction is located between a projection of the first side on the second intersection line and a projection of the second side on the second intersection line.

11. The display device of claim 9, wherein a plurality of function keys are configured on the watchcase, and the plurality of function keys are reused as the plurality of connection parts.

12. The display device of claim 2, wherein a first magnetic bonding part is configured on a non-display surface of the second display part, a second magnetic bonding part matching with the first magnetic bonding part is configured on the non-display surface of the second display part, the second magnetic bonding part is disposed at an end of the second display part in the first direction, and in condition that the flexible display component is reused as the watchband, the first magnetic bonding part and the second magnetic bonding part attract and overlap each other.

13. The display device of claim 2, wherein a first buckle part is configured on a non-display surface of the second display part, and the first buckle part is disposed at a first end of second display part in the first direction, wherein a second buckle part matching with the first buckle part is configured on the non-display surface of the second display part, and the second buckle part is disposed at a second end of second display part in the first direction opposite to the first end of the second display part.

14. The display device of claim 13, wherein the first buckle part comprises at least one cingulum straddling the second display part, wherein the second buckle part comprises a plurality of grooves, the at least one cingulum is configured to pass through a second end of the second display screen, and a second end of the folded third display screen is buckled into the at least one cingulum through the plurality of grooves.

15. The display device of claim 2, wherein in condition that both the first display part and the third display part are folded onto the display surface of the second display part, an unoverlapped area exists between the watchcase and the flexible display component, and a function module is configured at the back face of the watchcase in the unoverlapped area.

16. The display device of claim 15, wherein the function module comprises at least one of a camera or a handset.

17. The display device of claim 1, wherein a main circuit board is configured at an interior of the watchcase, and the main circuit board is configured to control image display of the first display screen and the flexible display component.

18. The display device of claim 2, wherein the first display surface is a watch display surface, the second display surface is a cellphone display surface, and the third display surface is a tablet computer display surface.

* * * * *